(12) United States Patent
Surprenant et al.

(10) Patent No.: US 8,128,095 B2
(45) Date of Patent: Mar. 6, 2012

(54) MECHANICAL SHAFT SEAL

(75) Inventors: Dean Surprenant, Mooers, NY (US);
Patrick J. Noel, Milton, VT (US);
Jeffrey S. Spooner, Essex, VT (US)

(73) Assignee: Plattco Corporation, Plattsburgh, NY (US)

( * ) Notice: Subject to any disclaimer, the term of this patent is extended or adjusted under 35 U.S.C. 154(b) by 639 days.

(21) Appl. No.: 11/763,684

(22) Filed: Jun. 15, 2007

(65) Prior Publication Data

US 2007/0290449 A1 Dec. 20, 2007

Related U.S. Application Data (60) Provisional application No. 60/804,873, filed on Jun. 15, 2006.

(51) Int. Cl.
*F16J 15/32* (2006.01)
*F16J 15/34* (2006.01)

(52) U.S. Cl. ......... 277/349; 277/351; 277/370; 277/390
(58) Field of Classification Search ............... 277/349, 277/350, 351, 352, 370, 390, 391, 394, 649
See application file for complete search history.

(56) References Cited

U.S. PATENT DOCUMENTS

2,797,940 A * 7/1957 Michener, Jr. et al. ....... 277/353
(Continued)

*Primary Examiner* — Shane Bomar
*Assistant Examiner* — Robert E Fuller
(74) *Attorney, Agent, or Firm* — Gerry J. Elman; Elman Technology Law, P.C.

(57) ABSTRACT

An improved mechanical shaft seal to give a tight seal between relatively rotating machine parts and prevent the escape of particulate material into the atmosphere or into the mechanical components of the housing under adverse operating conditions. The seal provides a grease chamber that prevents solid particles from reaching the main seal by migration within the mechanical shaft seal.

15 Claims, 8 Drawing Sheets

U.S. PATENT DOCUMENTS

| | | | |
|---|---|---|---|
| 2,826,465 A | 3/1958 | Gordon | |
| 3,072,414 A | 1/1963 | Porges | |
| 3,360,274 A * | 12/1967 | Grant | 277/353 |
| 3,480,285 A | 11/1969 | Anderson | |
| 3,692,318 A | 9/1972 | Day et al. | |
| 3,715,169 A | 2/1973 | Molis | |
| 3,722,896 A * | 3/1973 | Tankus | 277/395 |
| 3,746,351 A | 7/1973 | Tucker, Jr. | |
| 3,758,179 A | 9/1973 | Smith | |
| 4,213,618 A | 7/1980 | Thurber | |
| 4,380,416 A * | 4/1983 | Menager | 415/174.3 |
| 4,381,867 A | 5/1983 | Ohgoshi | |
| 4,474,379 A | 10/1984 | Holzer | |
| 4,491,331 A | 1/1985 | Salant et al. | |
| 4,695,063 A | 9/1987 | Schmitt et al. | |
| 5,186,472 A | 2/1993 | Romero et al. | |
| 5,267,736 A * | 12/1993 | Pietsch et al. | 277/308 |
| 5,387,040 A | 2/1995 | Firestone et al. | |
| 5,605,338 A | 2/1997 | Poll | |
| 5,645,283 A | 7/1997 | Drucktenhengst et al. | |
| 5,711,534 A | 1/1998 | Bengoa et al. | |
| 5,899,460 A * | 5/1999 | Altieri | 277/352 |
| 6,029,980 A | 2/2000 | Downes | |
| 6,186,507 B1 * | 2/2001 | Oldenburg | 277/353 |
| 6,428,013 B1 | 8/2002 | Johnston et al. | |
| 6,460,858 B1 * | 10/2002 | Kitajima et al. | 277/370 |
| 6,474,653 B1 | 11/2002 | Hintenlang et al. | |
| 6,520,506 B2 | 2/2003 | Reinhardt et al. | |
| 6,533,286 B1 | 3/2003 | Eckel et al. | |
| 6,666,459 B1 | 12/2003 | Hufnagel | |
| 6,729,624 B1 | 5/2004 | Johnston | |
| 2002/0074734 A1 | 6/2002 | Reinhardt et al. | |
| 2003/0151205 A1 * | 8/2003 | Szam | 277/352 |
| 2005/0073109 A1 | 4/2005 | Schwerdtfeger | |

* cited by examiner

MECHANICAL SHAFT SEAL

CROSS-REFERENCE TO RELATED APPLICATIONS

This application claims priority from U.S. Provisional Application 60/804,873, filed Jun. 15, 2006, the entire contents of which are incorporated herein by reference.

BACKGROUND

This invention relates to self-contained seals, particularly to devices and methods for providing a seal between two relatively rotatable machine parts, particularly suited for use in equipment for handling dry powdered material.

Manufacturing processes, such as mining and minerals, cement, or bulk powder production, require equipment that is capable of conveying, blending, mixing, or metering solids. In order to facilitate the movement of dry material through processing equipment a rotating shaft is often used, such as an agitator in the case of blending. Industries, like cement or mineral production, also force the movement of dry material that is in the form of small particles or powder by using pressurized vessels or lines. The vessels and lines used to convey raw materials must be constructed to prevent the release of particles from within a pressurized and sometimes heated system. The area around a rotating shaft is especially susceptible to the release of heated, abrasive solids. Leaks are prevented by incorporating shaft seals around the rotating shafts.

As those skilled in this art will appreciate, shaft seals for dry-material-handling equipment that operate under positive pressure can sometimes fail. Seals for this purpose typically have used high-pressure air lines to increase the pressure within seal housings. The increased pressure in the housing is higher than the pressure within the process equipment carrying the dust and solids; therefore, the dry material is unable to flow into the housing. Disadvantages of such pneumatic seals are increased cost (due to the need for maintenance and operation of air lines) and the risk of interrupted air supply. When air supply is interrupted, abrasive particles can escape from the system or into the housing of a seal. When such abrasive solids are introduced into shaft seal housing, they can quickly wear away rotating parts, leading to failure. The abrasive material will erode the vessel and surrounding parts. Therefore, the dry-material-handling industry requires shaft seals capable of preventing heated, abrasive solids under pressure from leaking without the use of pneumatic lines.

SUMMARY OF THE INVENTION

The present invention provides an improved mechanical shaft seal to give a tight seal between relatively rotating machine parts and prevent the escape of solid material into the atmosphere or into the mechanical components of the housing. The seal is effective in maintaining a tight seal under adverse operating conditions.

An advantage of the invention is that such a mechanical shaft seal is typically self-contained and avoids the need for pneumatic lines or maintenance.

Another advantage of the invention is that such a mechanical shaft seal is easily assembled and installed onto dry-material-handling equipment.

The combination of such a seal and dry-material-handling equipment is another aspect of the invention.

A feature of the mechanical shaft seal assembly of the present invention is a grease chamber that prevents solid particles from reaching the main seal by migration within the mechanical shaft seal. By keeping solids away from the main seal, the present mechanical shaft seal is able to maintain adequate force and prevent a breach between seal faces. The grease chamber also lubricates seal faces within the mechanical shaft seal to prevent seal faces from sticking to each other.

An aspect of the present invention provides a mechanical shaft seal adapted to be mounted externally such that one end thereof comprising a seal assembly is within a pressurized system containing dry material. Such a mechanical shaft seal desirably has a gland used to mount the mechanical shaft seal externally such that one end of the gland is exposed to the external atmosphere and the opposite end is mated with the sealing assembly, the gland having a bore therethrough to enable the gland to house a sealed bearing and a rotor sleeve, the rotating seal assembly also housing the rotor sleeve for rotation therein, and the rotor sleeve having a bore therethrough to enable the rotor sleeve to surround and sealingly engage a shaft for rotation therewith.

A more specific aspect of the invention provides a seal assembly comprising a grease housing, a lip seal, a grease chamber (a chamber having a substantial amount of grease contained therein), and a single-spring seal that prevents the migration of solid material into the rotating parts of mechanical shaft seal (which migration may result in damage due to the abrasive quality of the dry material), the grease housing and the lip seal having a bore to receive a rotor sleeve therethrough, and a stationary seat mounted around the rotor sleeve, the single-spring seal being mounted around the rotor sleeve and constrained in sealing engagement with the stationary seat, and the grease chamber bounded by the lip seal, grease housing, and rotor sleeve.

Other aspects, advantages and features of the invention will be apparent from the detailed description and claims presented below.

BRIEF DESCRIPTION OF THE DRAWINGS

The various features of the invention will become more apparent from the following description of an embodiment of the invention wherein reference is made to drawings.

DETAILED DESCRIPTION

Figure 1:
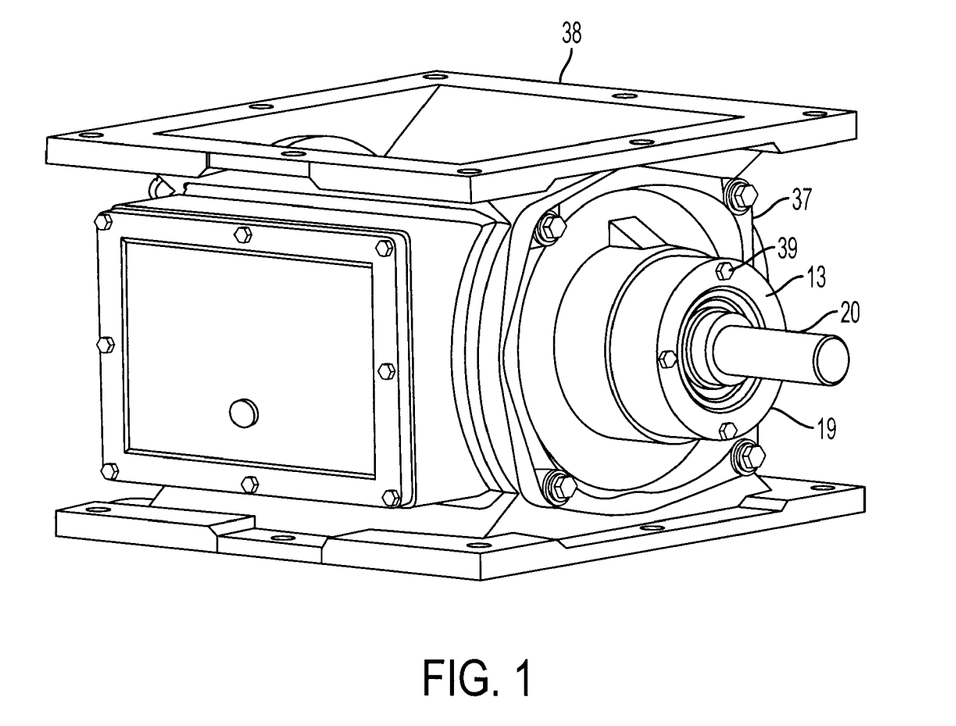
FIG. 1 is a perspective view of a mechanical shaft seal of the present invention mounted on the side wall of a flap valve.
Figure 2:
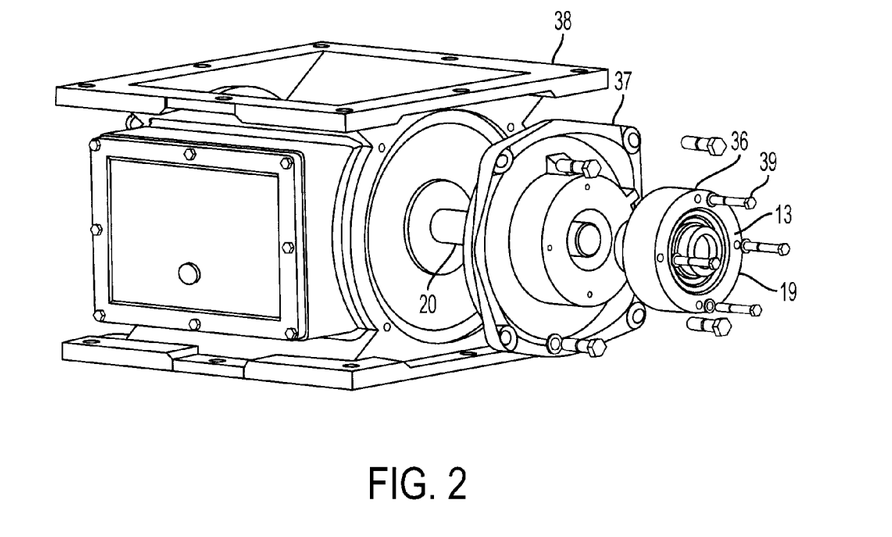
FIG. 2 is an exploded view of FIG. 1.

Referring to FIG. 1 and FIG. 2, a mechanical shaft seal embodying the present invention is adapted to be externally and sealingly mounted onto dry-material-handling equipment, such as onto a flap valve (e.g. an Airlock® valve sold by Plattco Corporation (Plattsburgh, N.Y.)), or a flap valve, or a diverter valve or other valve maintaining a pressure differential between two environments. Applications for a mechanical shaft seal of the invention include, but are not limited to, installation around an entry point of a mixer or packer.

Gland 13 for the mechanical shaft seal 19 is exposed to the outside atmosphere and secured to end cap 37, e.g. by fastening bolts 39 through apertures 36. End cap 37 is then attached to the side wall of flap valve 38. Shaft 20 extends from within flap valve 38 and through end cap 37 and mechanical shaft seal 19. A bore through the center axis of the mechanical shaft seal 19 is large enough to accept a rotating shaft 20 and prevents the release of dry material between the mechanical shaft seal 19 and the end cap 37, as well as preventing leaks between the rotating shaft 20 and the bore. No pneumatic lines are required in order to prevent dry material from escaping from the inside of the flap valve.

Figure 3:
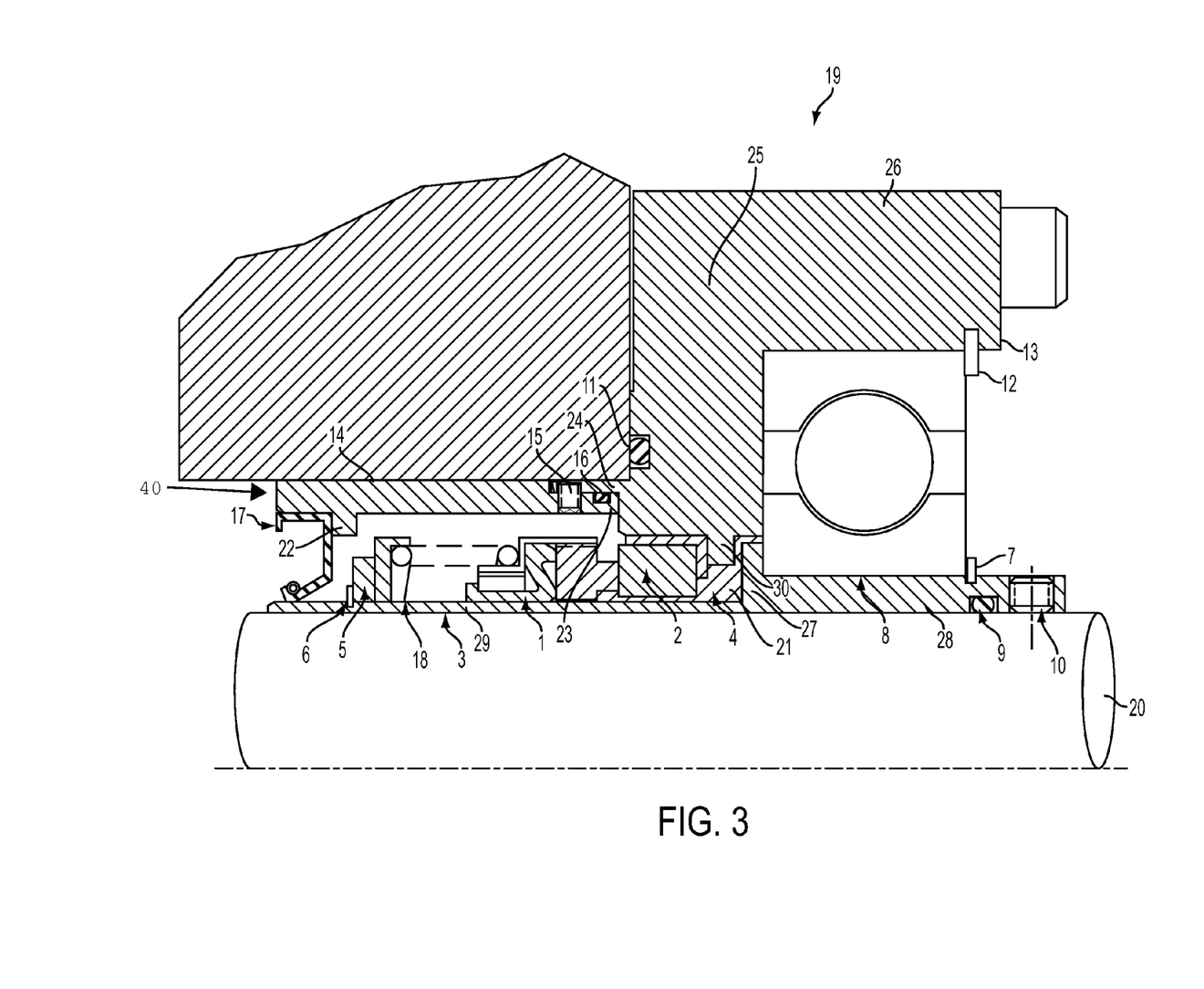
FIG. 3 is a cross-sectional view of half of a seal assembly according to the present invention.

Referring to FIG. 3, a mechanical shaft seal 19 is comprised of a seal assembly 40, a rotor sleeve 3, and gland 13. The seal assembly 40 is comprised of grease housing 14, lip seal 17, grease chamber 18, and a single-spring seal 1. The seal assembly 40 is secured to the rotor sleeve 3 via at least one snap ring 6. "Single-spring seal" is defined as a mechanical seal that is capable of rotating with a shaft while maintaining a seal with a stationary seat to prevent the migration of material along the length of the shaft. The seal assembly 40 is exposed to dry material under pressure. The gland 13 is mounted externally and exposed to the atmosphere. Extending along the axis of symmetry of mechanical shaft seal 19 is the rotor sleeve 3 and a rotatable shaft 20. The seal assembly 40 prevents the release of dry material into rotor chamber 21.

The ledge 22 provides a seat for a lip seal 17. The lip seal 17 is preferably made of a fluoroelastomer. Lip seal 17 creates a seal between the inner wall of grease housing 14 and the outer wall of the proximal end of portion 29 of rotor sleeve 3. The ledge 30 provides a step for a stationary seat 2. The stationary seat 2 is preferably made of tungsten carbide or silicon carbide. Stationary seat packing 4 is located in between stationary seat 2, ledge 30, and the inner wall of portion 25 of gland 13. Stationary seat packing 4 secures stationary seat 2 also provides a seal between the seal assembly 40 and chamber 21. Stationary seat packing 4 secures stationary seat 2 against spring seal 1 and provides a seal between chamber 18 and rotor chamber 21. The stationary seat packing 4 is preferably made of a fluoroelastomer. A rotating single-spring seal 1 disposed around portion 29 of rotor sleeve 3 presses against stationary seat 2. The single-spring seal 1 is preferably comprised of "316" stainless steel, Viton® (DuPont), and carbon. An annular groove around the outer wall of the proximal end of portion 29 of rotor sleeve 3 holds a snap ring 6 that secures the rotating single-spring seal 1 against stationary seat 2. The snap ring 6 is preferably made of "302" stainless steel. A back-up ring 5 is disposed around rotor sleeve 3 between snap ring 6 and single-spring seal 1. The back-up ring 5 is preferably made of "316" stainless steel. Snap ring 6 and back-up ring 5 set the operating length of single-spring seal 1. Chamber 18 houses snap ring 6, back-up ring 5, and single-spring seal 1. Chamber 18, which is bounded by the lip seal 17, the inner wall of grease housing 14, stationary seat 2, and the outer wall of portion 29 of rotor sleeve 3, is packed with grease.

Fluoroelastomer O-rings useful in the present invention include those of fluorocarbon rubber (FKM) such as Viton® (DuPont). Grease useful in the present invention includes grease conforming to NLGI 2 (National Lubricating Grease Institute grade 2, corresponding to a worked penetration value of 265-295, using the standard NLGI penetration test apparatus, as is known in the art), which are lubricants exhibiting high viscosity and that are resistant to breakdown. Preferably, the lubricants are Almagard® lubricants, e.g. Almagard 3752 NLGI 2 (Lubrication Engineers, Inc., Fort Worth, Tex.).

Portion 25 of gland 13 and annular collar 27 form an annulus that provides a seat for a sealed bearing 8 disposed around portion 28 of rotor sleeve 3 that bears against portion 26 of gland 13. In order to prevent sealed bearing 8 from moving axially that would result in potential leakage of dry material, sealed bearing 8 is press fit onto portion 28. An annular groove in the outer wall of portion 28 holds a snap ring 7 and an annular groove in the inner wall of portion 26 holds a snap ring 12. Snap rings 7 and 12 secure the sealed bearing 8 against portion 25 of the gland 13. Snap rings 7 and 12 are preferably made of "302" stainless steel.

A plurality of set screws 15 extend radially through the male coupling 23 and female coupling 24 to secure the grease housing 14 to the gland 13. The set screws 15 are preferably made of hardened steel. An annular groove in the male coupling 23 is adjacent to the set screw and holds the grease housing O-ring 16. The grease housing O-ring 16 is preferably made of a fluoroelastomer. A circumferential groove adjacent to the female coupling 24 holds the gland O-ring 11. The gland O-ring 11 is preferably made of a fluoroelastomer.

Figure 4:
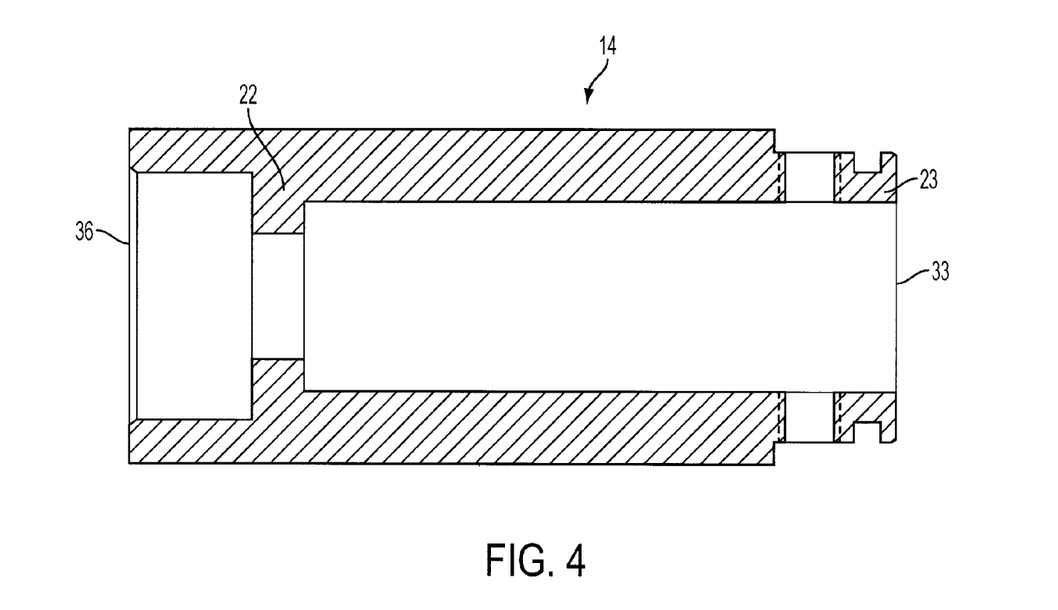
FIG. 4 is a cross-sectional view of a grease housing according to the present invention.

Referring to FIG. 4, grease housing 14 is cylindrical with a proximal end 36 exposed to the pressurized dry material and a distal end 33. The grease housing 14 is preferably made of "304" stainless steel. Grease housing 14 has a short ledge portion 22 that extends inwards radially at the proximal end 36 of the grease housing 14. Grease housing 14 also has a male coupling 23 integrally connected at the distal end 33 of the grease housing 14.

Figure 5:
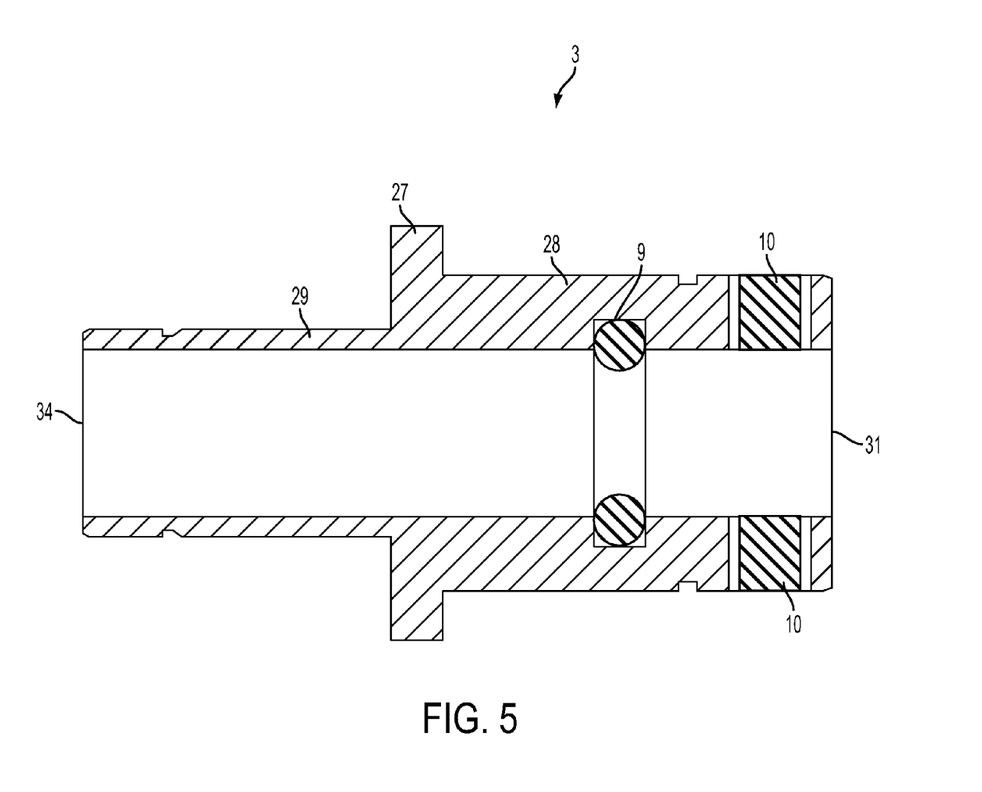
FIG. 5 is a cross-sectional view of a rotor sleeve according to the present invention.

Referring to FIG. 5, rotor sleeve 3 has a proximal end 34 exposed to the dry material and a distal end 31 exposed to the atmosphere. Rotor sleeve 3 is preferably made of "304" stainless steel. Rotor sleeve 3 includes three main portions: an elongated barrel portion 29 located at proximal end 34, a short barrel portion 28 located at the distal end 31, and an annular collar 27 located between portions 28 and 29. Rotor sleeve 3 has a bore extending axially therethrough, sized to accommodate shaft 20. A plurality of set screws 10 extend radially through the distal end 31 of portion 28. The set screws 10 are preferably made of alloy steel. An annular groove adjacent to the set screws 10 in the inner wall of the rotor sleeve 3 holds the sleeve O-ring 9. The sleeve O-ring 9 is preferably made of a fluoroelastomer.

Figure 6:
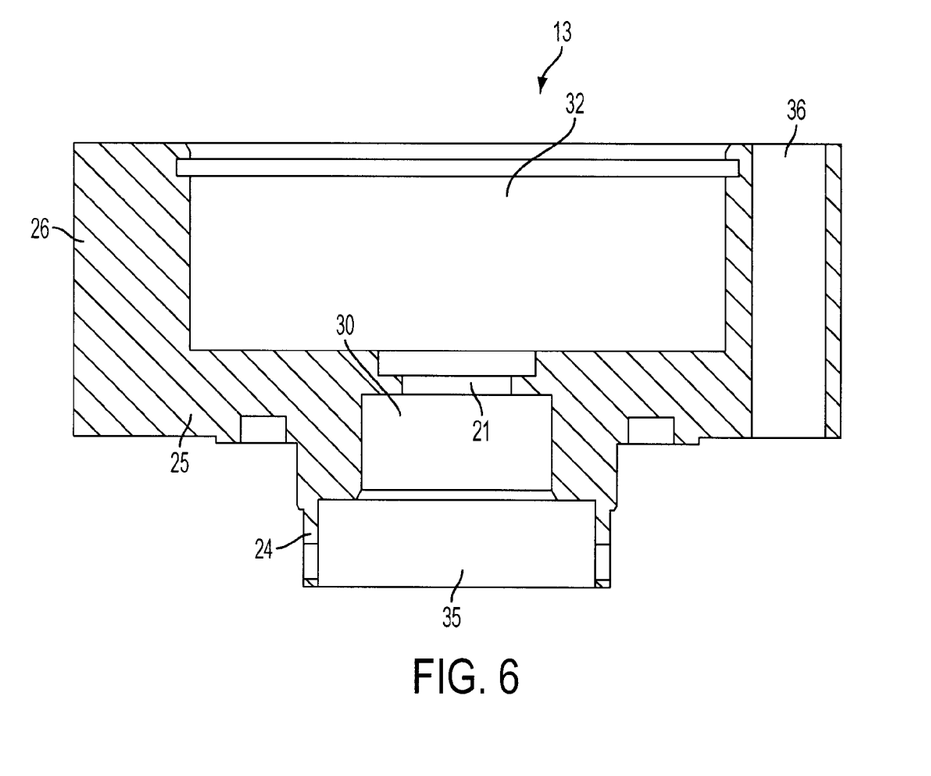
FIG. 6 is a cross-sectional view of a gland according to the present invention.

Referring to FIG. 6, gland 13 has a proximal end 35 which connects to grease housing 14 (FIG. 4) and a distal end 32 exposed to the atmosphere. The gland 13 is preferably made of "304" stainless steel. The gland 13 includes an axially directed portion 26 and a radially directed portion 25 thus giving a segment of such gland, as seen in cross-section, a generally L-shaped appearance. Portion 25 has a short ledge portion 30 that extends inwards radially into the rotor chamber 21. Gland 13 has a bore extending axially therethrough sized to accommodate the rotor sleeve 3 and a plurality of circumferentially-spaced apertures 36 through portion 26. The proximal end 35 of gland 13 has a female coupling 24.

Figure 7:
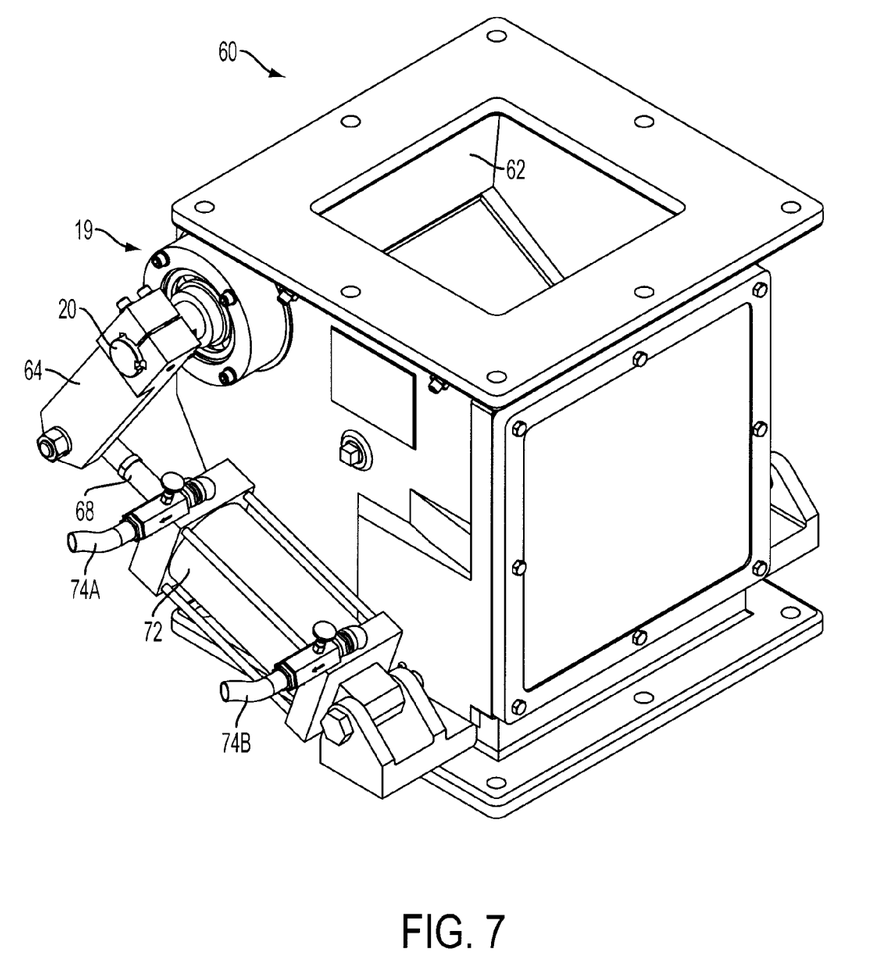
FIG. 7 is a perspective view of an alternative embodiment of a mechanical shaft seal of the present invention mounted on the side wall of a flap valve.
Figure 8:
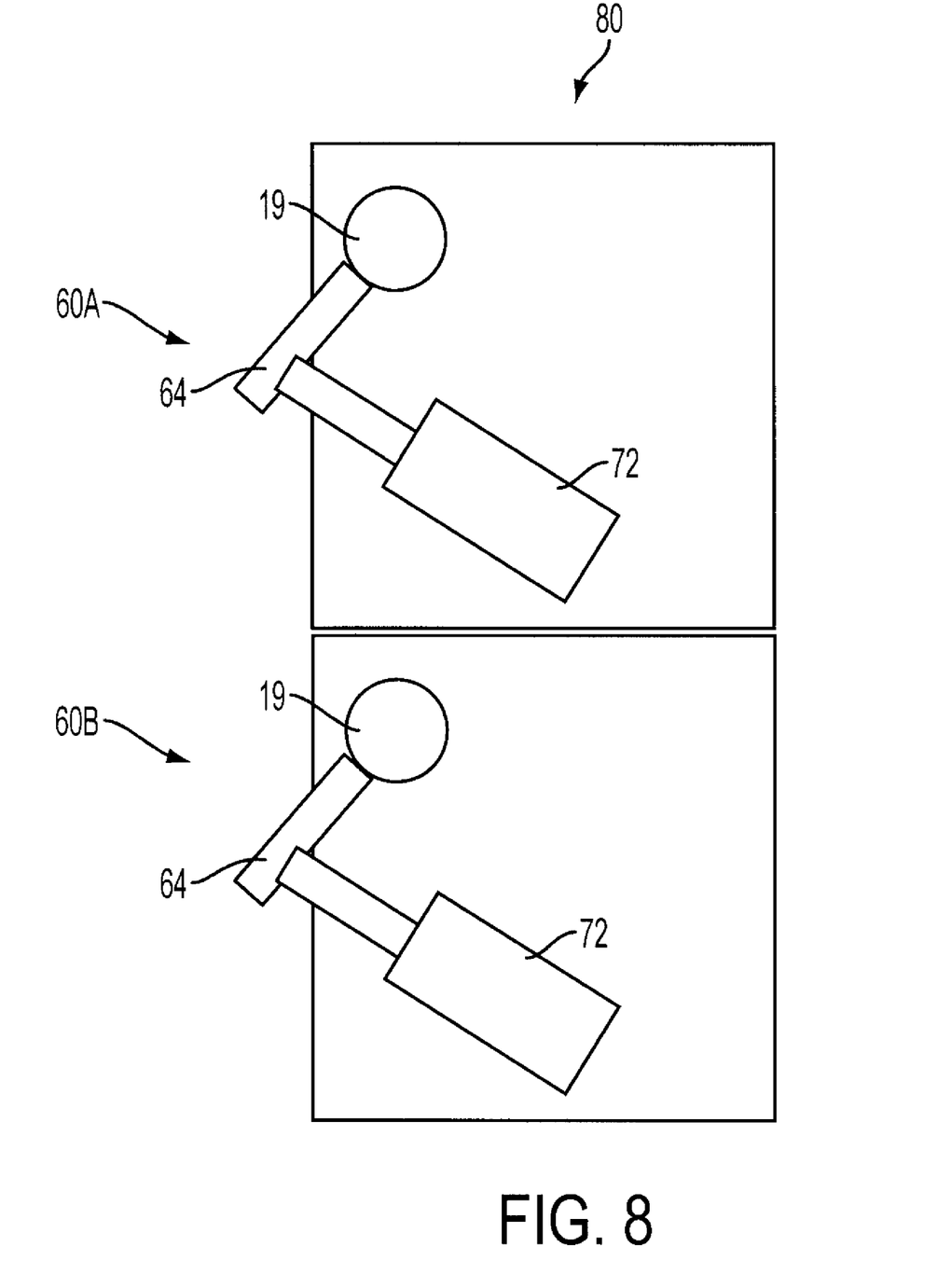
FIG. 8 illustrates a multiple valve configuration.

Referring to FIG. 7 and FIG. 8, an alternative embodiment of a flap valve 60 that uses mechanical shaft seal 19 is shown. In this embodiment, flap valve 60 has opening 62 to receive material. Shaft 20 is mechanically linked to a flap (not shown) that is movable to either restrict or allow the flow of material within flap valve 60. Shaft 20 is mechanically linked to lever 64, which is mechanically linked to air cylinder 72 via cylinder shaft 68. Pneumatic supply lines (74A and 74B) are fed by a compressed air system (not shown). In operation the air cylinder is activated and deactivated to control the flow of material through the valve as desired.

FIG. 8 illustrates a flap valve system 80. In embodiment shown, multiple flap valves (here, indicated as 60A and 60B) are arranged in a vertical manner as shown. The multiple valve configuration allows for more precise control of the flow of the material. Preferably, the flap valves are configured to have opposite phases. That is, when flap valve 60A is "open" and allowing material to pass through it, valve 60B is closed, and material accumulates in valve 60B, but can not exit since valve 60B is closed. Then in the next cycle, valve 60A is closed, and valve 60B is open, allowing only the material that had been previously deposited in valve 60B to pass through. The opposite phase relationship can be implemented via a pneumatic control system (not shown) that opens and closes flap valves 60A and 60B with the desired timing sequence. In one embodiment, the multiple valve configuration comprises two flap valves. However, it is possible to use more than two valves without departing from the scope of the present invention.

Although the present invention has been described in connection with a specified embodiment thereof, many other modifications, corrections and applications are apparent to those skilled in the art. Therefore, the scope of the present invention is not limited to the embodiment described herein.

What is claimed is:

1. A mechanical shaft seal comprising a rotary seal ring, a stationary seal seat, a gland and a rotor sleeve for relative rotation,
    said rotor sleeve having an inner wall, an outer wall, a first distal end and a second distal end,
    a seal assembly comprising a stationary grease housing, a lip seal connected thereto near said first distal end, and a grease chamber containing grease bounded by at least said lip seal, said rotary seal ring and said stationary grease housing,
    said rotary seal ring surrounding said rotor sleeve and secured near said first distal end,
    said stationary grease housing surrounds said rotary seal ring,
    said stationary seal seat being secured to said gland,
    said gland surrounding said rotor sleeve,
    said rotary seal ring surrounding said rotor sleeve, in sealing engagement with said stationary seal seat, and
    said rotor sleeve having a bore therethrough to enable said rotor sleeve to surround and sealingly engage a shaft for rotation with said shaft.

2. The mechanical shaft seal according to claim 1 wherein said rotary seal ring is provided by an axial biasing force that engages the stationary seal seat.

3. The mechanical shaft seal according to claim 1, further comprising a sealed bearing in sealing engagement within said gland and surrounding said rotor sleeve.

4. The mechanical shaft seal according to claim 1, wherein said seal assembly having said rotary seal ring is comprised of 316 stainless steel, an elastomer, and carbon.

5. The mechanical shaft seal according to claim 1, wherein said grease chamber contains grease having an NLGI grade of 2.

6. The mechanical shaft seal according to claim 1, wherein said stationary seal seat is made of a substance comprising tungsten carbide.

7. The mechanical shaft seal according to claim 1, wherein said stationary seal seat is made of a substance comprising silicon carbide.

8. The mechanical shaft seal according to claim 1, wherein said rotor sleeve is comprised of 304 stainless steel.

9. The mechanical shaft seal of claim 8, wherein the rotor sleeve further comprises a first annular groove within the inner wall of the rotor sleeve, said annular groove holding a sleeve O-ring.

10. The mechanical shaft seal of claim 9, wherein said rotor sleeve further comprises a second annular groove around the outer wall of the rotor sleeve, and a snap ring disposed within said second annular groove.

11. The mechanical shaft seal of claim 10, wherein said snap ring is comprised of 302 stainless steel.

12. The mechanical shaft seal of claim 9, wherein said sleeve O-ring is comprised of a fluoroelastomer.

13. The mechanical shaft seal of claim 1, wherein said lip seal is comprised of a fluoroelastomer.

14. A mechanical shaft seal adapted to be used with dry-material-handling equipment, comprising:
    a rotary seal ring, a stationary seal seat, a gland, and a rotor sleeve for relative rotation,
    said rotor sleeve having an inner wall, an outer wall, a first distal end and a second distal end,
    a seal assembly comprising a stationary grease housing, a lip seal connected thereto near said first distal end, and a grease chamber containing grease bounded by at least said lip seal, said rotary seal ring and said stationary grease housing,
    said grease housing having a bore therethrough to receive said rotor sleeve, said rotary seal ring being disposed around said rotor sleeve near said first distal end and in sealing engagement with said stationary seal seat,
    said lip seal being disposed around said rotor sleeve and between said rotor sleeve and said grease housing,
    said stationary seal seat being disposed around said rotor sleeve in sealing engagement with said rotary seal ring and secured to said gland, and
    said gland having a bore therethrough to receive said rotor sleeve.

15. The mechanical shaft seal according to claim 14, wherein a sealed bearing is disposed around said rotor sleeve within an annulus bounded by said gland and said rotor sleeve.

* * * * *